(12) United States Patent
Cen et al.

(10) Patent No.: US 11,770,999 B2
(45) Date of Patent: Oct. 3, 2023

(54) ULTRAVIOLET DEVICE USED FOR POTATO PEEL RIPENING

(71) Applicant: Inner Mongolia University of Technology, Hohhot (CN)

(72) Inventors: Haitang Cen, Hohhot (CN); Tengfei Zhang, Hohhot (CN); Yuhong Chen, Hohhot (CN); Jianguo Qin, Hohhot (CN); Jianlan Liu, Hohhot (CN)

(73) Assignee: Inner Mongolia University of Technology, Hohhot (CN)

( * ) Notice: Subject to any disclaimer, the term of this patent is extended or adjusted under 35 U.S.C. 154(b) by 362 days.

(21) Appl. No.: 17/345,371

(22) Filed: Jun. 11, 2021

(65) Prior Publication Data

US 2022/0183222 A1 Jun. 16, 2022

(30) Foreign Application Priority Data

Dec. 11, 2020 (CN) .......................... 202011456412.8

(51) Int. Cl.
*A01D 17/00* (2006.01)
*A01D 33/08* (2006.01)
*A23B 7/015* (2006.01)

(52) U.S. Cl.
CPC ............. *A01D 33/08* (2013.01); *A01D 17/00* (2013.01); *A23B 7/015* (2013.01)

(58) Field of Classification Search
CPC ........ A01D 33/00–33/14; A01D 13/00; A01D 15/00–15/04; A01D 17/00–17/22; A01D 19/00–19/18; A23B 7/00–7/16; A61L 2/08; A61L 2/10; A23L 3/26; A23L 3/28
See application file for complete search history.

(56) References Cited

U.S. PATENT DOCUMENTS

2019/0320671 A1* 10/2019 Mitchell .................. A23L 3/28

FOREIGN PATENT DOCUMENTS

| CN | 110366927 A | * | 10/2019 | |
| CN | 109348823 B | * | 2/2022 | ............. A01D 17/00 |
| CN | 109348824 B | * | 4/2022 | ............. A01D 17/10 |
| EP | 0212151 A1 | * | 3/1987 | |
| KR | 20170002906 A | * | 1/2017 | |

* cited by examiner

*Primary Examiner* — Adam J Behrens
*Assistant Examiner* — Madeline I Runco
(74) *Attorney, Agent, or Firm* — Harness, Dickey & Pierce, P.L.C.

(57) ABSTRACT

An ultraviolet device for potato peel ripening includes a left protection plate and a right protection plate, wherein a first-stage potato-soil separation device and a second-stage potato-soil separation device are sequentially arranged between the left protection plate and the right protection plate, a triangular ventilation pipeline is arranged above the first-stage potato-soil separation device and the second-stage potato-soil separation device, front air outlets are formed in the surface, corresponding to the first-stage potato-soil separation device, of the triangular ventilation pipeline, lower air outlets are formed in the surface, corresponding to the second-stage potato-soil separation device, of the triangular ventilation pipeline, the triangular ventilation pipeline communicates with a centrifugal fan, the left protection plate and the right protection plate are provided with a plurality of plant ultraviolet light supplementing lamps used for irradiating the first-stage potato-soil separation device and the second-stage potato-soil separation device respectively.

10 Claims, 3 Drawing Sheets

ULTRAVIOLET DEVICE USED FOR POTATO PEEL RIPENING

CROSS-REFERENCE TO RELATED APPLICATION

This application claims the benefit and priority of Chinese Patent Application No. 202011456412.8, filed Dec. 11, 2020, the disclosure of which is incorporated herein by reference here in its entirety as part of the present application.

FIELD

The present disclosure relates to the technical field of farm machinery, and particularly relates to an ultraviolet device used for potato peel ripening.

BACKGROUND

Potato is the fourth most important food crop worldwide, second only to wheat, rice, and corn. At present, a large quantity of widely-used small and medium-sized potato harvesters in China can complete digging, potato and soil separation and strip collection, but potato picking, bagging, centralized transportation and grading in the later period still need a large amount of manpower to complete. Along with the development of urbanization, the conflict between insufficient labor force and high cost is increasingly prominent, the picking cost accounts for about 10% of the price of a potato production area and has become a main bottleneck for restricting efficiency improvement and income increase of the potato planting industry, and the requirement for comprehensive mechanization of potato harvesting is very urgent.

The large-sized potato combine harvester can integrate harvesting steps of potato digging, separation, transportation, picking and the like, but is not widely popularized even though the efficiency and the automation level of the large-sized potato combine harvester are high, so that the commodity value of the potatoes is obviously reduced due to the facts that the potato combine harvesting process is long and the peel damage rate of fresh potatoes is high; and in addition, the equipment investment is large, and the operation reliability is low, so that the yield of potato planting is increased but the income cannot be increased.

SUMMARY

The present disclosure aims to provide an ultraviolet device used for potato peel ripening in order to overcome the defects in the prior art, the ultraviolet device is installed at the tail end of a lifting chain of a potato combine harvester, the potato peel ripening performance can be improved in good time, the potato peel damage resistance is remarkably improved, smooth implementation of processes such as potato subsequent centralized transportation and grading is facilitated, the operation effect of the potato combine harvester is comprehensively improved, and efficiency improvement and income increase of the potato planting industry are promoted.

In order to achieve the purpose, the present disclosure adopts the following technical scheme: the ultraviolet device used for potato peel ripening comprises a left protection plate and a right protection plate, a first-stage potato-soil separation device and a second-stage potato-soil separation device are sequentially arranged between the left protection plate and the right protection plate, a triangular ventilation pipeline is arranged above the first-stage potato-soil separation device and the second-stage potato-soil separation device, front air outlets are formed in the surface, corresponding to the first-stage potato-soil separation device, of the triangular ventilation pipeline, lower air outlets are formed in the surface, corresponding to the second-stage potato-soil separation device, of the triangular ventilation pipeline, the triangular ventilation pipeline communicates with a centrifugal fan through the rectangular ventilation pipeline, and the left protection plate and the right protection plate are provided with a plurality of plant ultraviolet light supplementing lamps used for irradiating the first-stage potato-soil separation device and the second-stage potato-soil separation device respectively.

As further description of the technical scheme, the ultraviolet device further comprises a rack, and the right protection plate and the left protection plate are arranged on the rack.

As further description of the technical scheme, the ultraviolet device further comprises a speed changer, a driving wheel, a power input shaft and a centrifugal fan belt wheel, the power input shaft is connected with the speed changer, the speed changer penetrates through the right protection plate through a rotating shaft to be connected with the driving wheel, the centrifugal fan belt wheel is arranged on an input shaft of the centrifugal fan, and the driving wheel is connected with the centrifugal fan belt wheel through a belt. The power input shaft transmits power to the speed changer, the power is transmitted to the driving wheel after speed change, the centrifugal fan belt wheel is driven through the belt, then centrifugal fan blades are driven to rotate, and generated air is blown to the surface of the first-stage potato-soil separation device and a gap between the first-stage potato-soil separation device and the second-stage potato-soil separation device from the front air outlets and the lower air outlets through the triangular ventilation pipeline.

As further description of the technical scheme, the ultraviolet device further comprises a storage battery, and the storage battery is arranged in a protection box between the rack and the right protection plate and provides power for the plant ultraviolet light supplementing lamps.

As further description of the technical scheme, the centrifugal fan comprises a fan shell, a bearing and a plurality of centrifugal fan blades.

As further description of the technical scheme, the centrifugal fan is connected to a cross beam of the rack with bolts through an external fixed support.

As further description of the technical scheme, three plant ultraviolet light supplementing lamps are provided, and two of the three plant ultraviolet light supplementing lamps are distributed and fixed on the left protection plate and the right protection plate. The first plant ultraviolet light supplementing lamp obliquely irradiates a place where potatoes fall from the first-stage potato-soil separation device to the second-stage potato-soil separation device; the second plant ultraviolet light supplementing lamp irradiates downwards in parallel with the second-stage potato-soil separation device, and impurities are basically separated at the tail end of the second-stage potato-soil separation device; and the third plant ultraviolet light supplementing lamp is fixed on the rack, and the irradiation direction is obliquely upward, so that irradiation can be completed, and impurities are prevented from being accumulated.

As further description of the technical scheme, the front air outlets and the lower air outlets are uniformly arranged at intervals.

As further description of the technical scheme, the plant ultraviolet light supplementing lamps comprise a plurality of LED lamps which are arranged at intervals.

The present disclosure has the following beneficial effects: The ultraviolet device is simple in structure and solves the problem that potato peel is easy to break in long-distance centralized transportation on the potato combine harvester, the peel damage rate of the potatoes is greatly reduced, the ultraviolet device is more effective in impurity separation, few in broken potatoes and low in operation cost, and benefits for vast growers are greatly improved, so that the device is very suitable for the requirements of vast growers.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected examples and not all possible implementations, and are not intended to limit the scope of the present disclosure.

DETAILED DESCRIPTION

The following clearly and completely describes the technical scheme in the examples of the present disclosure with reference to the attached figures in the examples of the present disclosure. Apparently, the described examples are merely a part rather than all of the examples of the present disclosure. All other examples obtained by those skilled in the art based on the examples of the present disclosure without creative efforts shall fall within the protection scope of the present disclosure.

In the description of the present disclosure, the indicative direction or position relations of the terms such as "center", "upper", "lower", "left", "right", "vertical", "horizontal", "inside" and "outside" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure; the terms such as "first", "second" and "third" are just used for a purpose of description, but cannot be understood to indicate or hint relative importance, moreover, except as otherwise noted, the terms such as "install", "link" and "connect" should be generally understood, for example, the components can be fixedly connected, and also can be detachably connected or integrally connected; the components can be mechanically connected, and also can be electrically connected; the components can be directly connected, also can be indirectly connected through an intermediate, and can be communicated internally. For those skilled in the art, the specific meanings of the terms in the present disclosure can be understood according to specific conditions.

The present disclosure provides an ultraviolet device used for potato peel ripening, the ultraviolet device is installed at the tail end of a lifting chain of a potato combine harvester, and the potato harvester is used for further removing impurities such as stems and leaves and quickly removing moisture of fresh potato peel by utilizing a centrifugal fan after potato digging and potato-soil separation are completed. Under the combined action of the centrifugal fan and the ultraviolet light supplementing lamps, potato peel ripening is accelerated, so that the peel damage rate is reduced in the later long-distance centralized transportation process, the commodity value of the potatoes is improved, the shortcoming that the potato combine harvester is high in damage rate is fundamentally solved, and the potato planting benefit is practically improved.

Figure 1:
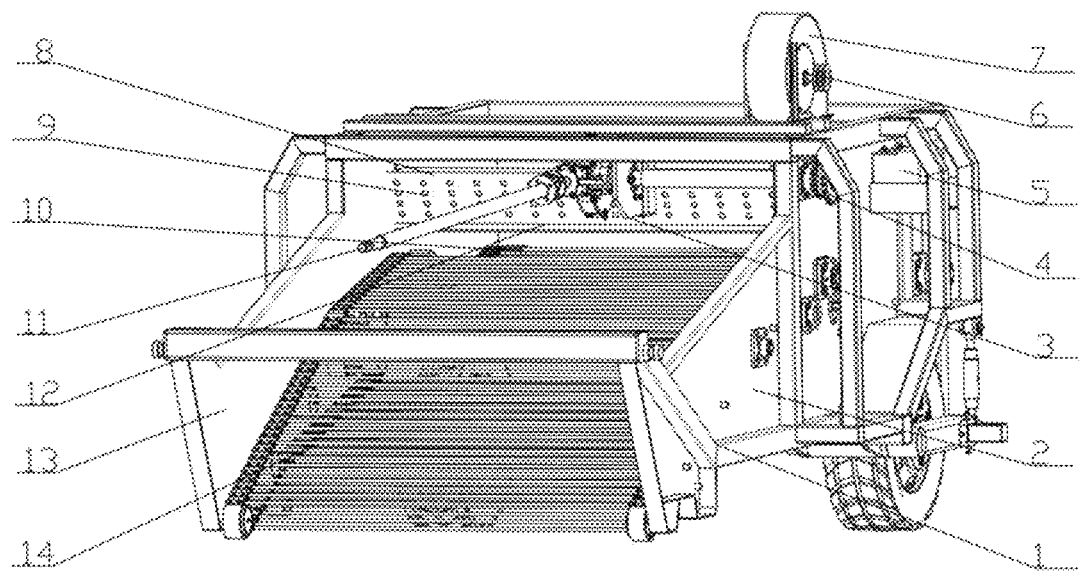
FIG. 1 is a structural front view of an ultraviolet device which is installed on a potato combine harvester and is used for potato peel ripening.
Figure 2:
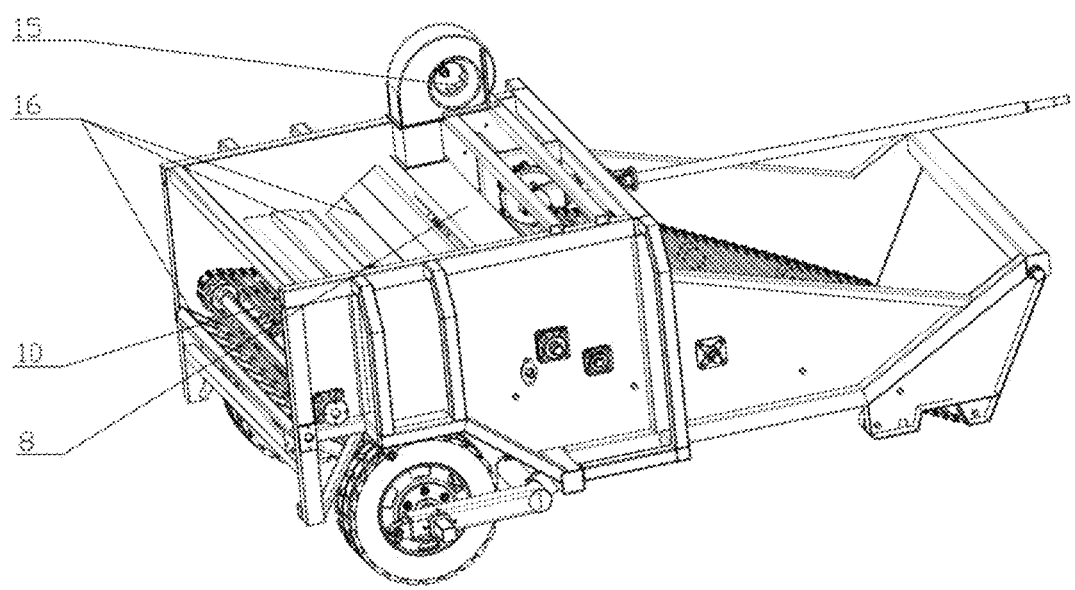
FIG. 2 is a structural rear view of the ultraviolet device which is installed on the potato combine harvester and is used for potato peel ripening.
Figure 3:
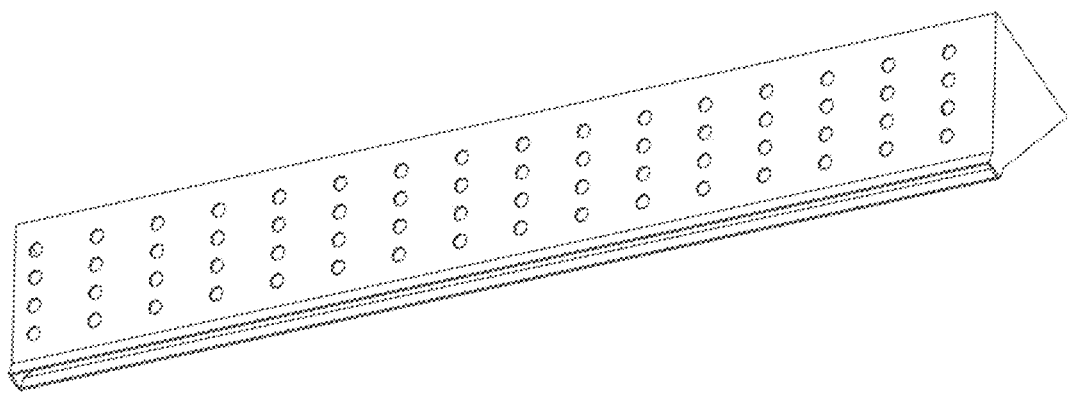
FIG. 3 is a structural schematic diagram of a ventilation pipeline of the ultraviolet device which is installed on the potato combine harvester and is used for potato peel ripening.
Figure 4:
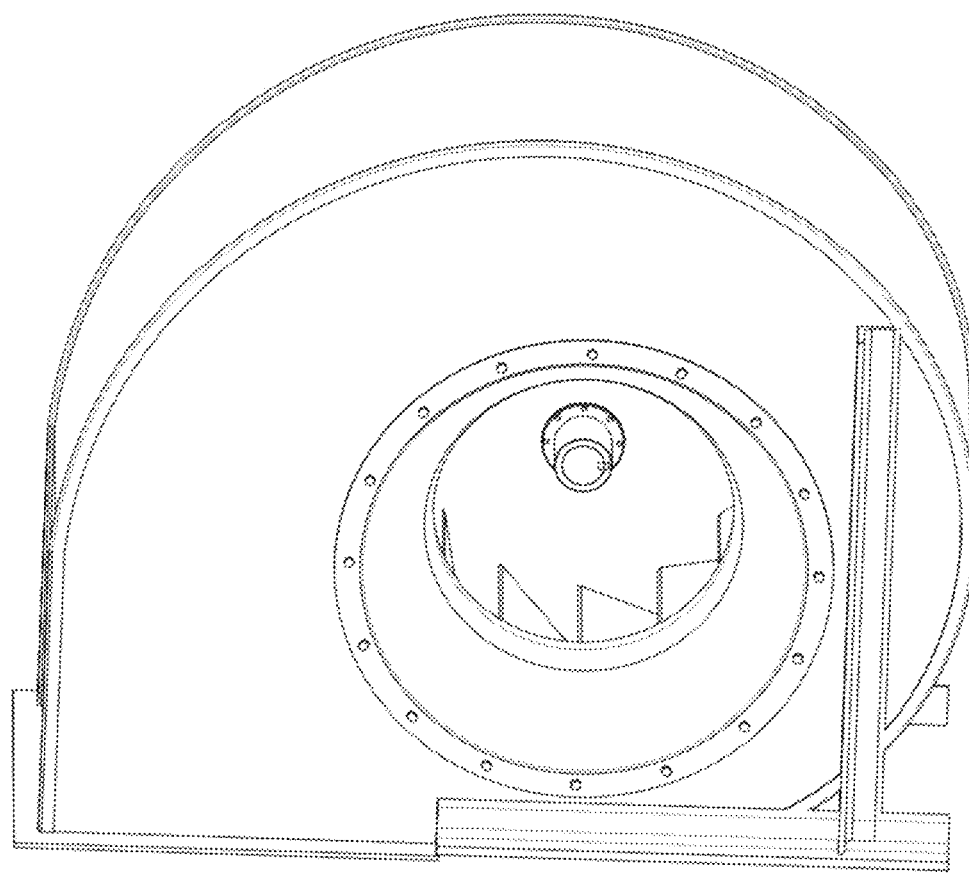
FIG. 4 is a structural schematic diagram of a centrifugal fan of the ultraviolet device which is installed on the potato combine harvester and is used for potato peel ripening.
Figure 5:
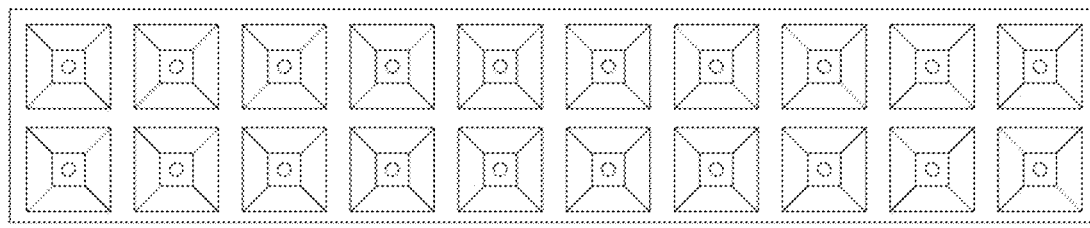
FIG. 5 is a structural schematic diagram of plant ultraviolet light supplementing lamps of the ultraviolet device which is installed on the potato combine harvester and is used for potato peel ripening.

Referring to FIG. 1 to FIG. 5, in an example provided by the present disclosure, an ultraviolet device used for potato peel ripening comprises a left protection plate (13) and a right protection plate (2), a first-stage potato-soil separation device (14) and a second-stage potato-soil separation device (10) are sequentially arranged between the left protection plate (13) and the right protection plate (2), a triangular ventilation pipeline (8) is arranged above the first-stage potato-soil separation device (14) and the second-stage potato-soil separation device (10), a plurality of front air outlets (9) are formed in the surface, corresponding to the first-stage potato-soil separation device (14), of the triangular ventilation pipeline (8), a plurality of lower air outlets (12) are formed in the surface, corresponding to the second-stage potato-soil separation device (10), of the triangular ventilation pipeline (8), the triangular ventilation pipeline (8) communicates with a centrifugal fan (7) through the rectangular ventilation pipeline, and the left protection plate (13) and the right protection plate (2) are provided with a plurality of plant ultraviolet light supplementing lamps (16) used for irradiating the first-stage potato-soil separation device (14) and the second-stage potato-soil separation device (10) respectively.

In the example, the ultraviolet device further comprises a rack (1), and the right protection plate (2) and the left protection plate (13) are arranged on the rack (1).

In the example, the ultraviolet device further comprises a speed changer (3), a driving wheel (4), a power input shaft (11) and a centrifugal fan belt wheel (6), the power input shaft (11) is connected with the speed changer (3), the speed changer (3) penetrates through the right protection plate (2) through a rotating shaft to be connected with the driving wheel (4), the centrifugal fan belt wheel (6) is arranged on an input shaft of the centrifugal fan (7), and the driving wheel (4) is connected with the centrifugal fan belt wheel (6) through a belt. The power input shaft (11) transmits power to the speed changer (3), the power is transmitted to the driving wheel (4) after speed change, the centrifugal fan belt wheel (6) is driven through the belt, then centrifugal fan blades (15) are driven to rotate, and generated air is blown to the surface of the first-stage potato-soil separation device (14) and a gap between the first-stage potato-soil separation device (14) and the second-stage potato-soil separation device (10) from the front air outlets (9) and the lower air outlets (12) through the triangular ventilation pipeline (8).

In the example, the ultraviolet device further comprises a storage battery (5), and the storage battery (5) is arranged in a protection box between the rack (1) and the right protection plate (2) and provides power for the plant ultraviolet light supplementing lamps (16).

In the example, the centrifugal fan (7) comprises a fan shell, a bearing and a plurality of centrifugal fan blades (15); and the centrifugal fan (7) is connected to a cross beam of the rack (1) with bolts through an external fixed support.

In the example, three plant ultraviolet light supplementing lamps (16) are provided, and two of the three plant ultraviolet light supplementing lamps (16) are distributed and fixed on the left protection plate (13) and the right protection plate (2). The first plant ultraviolet light supplementing lamp (16) obliquely irradiates a place where potatoes fall from the first-stage potato-soil separation device (14) to the second-stage potato-soil separation device (10); the second plant ultraviolet light supplementing lamp (16) irradiates downwards in parallel with the second-stage potato-soil separation device (10), and impurities are basically separated at the tail end of the second-stage potato-soil separation device (10); and the third plant ultraviolet light supplementing lamp (16) is fixed on the rack (1), and the irradiation direction is obliquely upward, so that irradiation can be completed, and impurities are prevented from being accumulated.

In the example, the front air outlets (9) and the lower air outlets (12) are uniformly arranged at intervals.

In the example, the plant ultraviolet light supplementing lamps (16) comprise a plurality of LED lamps which are arranged at intervals.

In the example, the air outlets of the triangular ventilation pipeline (8) can blow air to the upper oblique surface of the first-stage potato-soil separation device and the gap between the first-stage potato-soil separation device and the second-stage potato-soil separation device.

The ultraviolet device used for potato peel ripening is installed on the potato combine harvester, is connected with a general tractor during working, drives the harvester to complete potato digging when the tractor advances, the potatoes and soil enter a first-stage potato-soil separation device to be subjected to potato-soil separation, the driving wheel on a power output shaft of the speed changer drives the centrifugal fan to work, and the ventilation pipeline blows air to the oblique surface of the first-stage potato-soil separation device and the gap between the first-stage potato-soil separation device and the second-stage potato-soil separation device, so that impurity removal and potato peel ripening are carried out. After the potatoes enter the second-stage potato-soil separation device, the potatoes are comprehensively irradiated by the plant ultraviolet light supplementing lamps, and the peel ripening of the potatoes is promoted again.

According to the device, on the basis of completing potato digging, separation and centralized transportation, the peel damage rate of the potatoes is greatly reduced, benefits for vast growers are greatly improved, the peel breakage problem caused by long-distance centralized transportation during combined harvesting is solved, the agricultural and quality requirements of potato harvesting are met, the comprehensive performance of the harvester is also improved, and the economic benefit is particularly remarkable.

Finally, it should be noted that the above description is merely a preferred example of the present disclosure and is not intended to limit the present disclosure. Although the present disclosure is described in detail with reference to the foregoing examples, those skilled in the art should understand that they may still make modifications to the technical schemes described in the foregoing examples or make equivalent replacements to some technical features thereof. Any modification, equivalent replacement, or improvement made without departing from the spirit and principle of the present disclosure shall fall within the protection scope of the present disclosure.

What is claimed is:

1. An ultraviolet device used for potato peel ripening, comprising a left protection plate and a right protection plate, wherein a first-stage potato-soil separation device and a second-stage potato-soil separation device are sequentially arranged between the left protection plate and the right protection plate, a triangular ventilation pipeline is arranged above the first-stage potato-soil separation device and the second-stage potato-soil separation device, a plurality of front air outlets are formed in a surface, corresponding to the first-stage potato-soil separation device, of the triangular ventilation pipeline, a plurality of lower air outlets are formed in the surface, corresponding to the second-stage potato-soil separation device, of the triangular ventilation pipeline, the triangular ventilation pipeline communicates with a centrifugal fan through a rectangular ventilation pipeline, and the left protection plate and the right protection plate are provided with a plurality of plant ultraviolet light supplementing lamps used for irradiating the first-stage potato-soil separation device and the second-stage potato-soil separation device, respectively.

2. The ultraviolet device used for potato peel ripening according to claim 1, wherein the ultraviolet device further comprises a rack, and the right protection plate and the left protection plate are arranged on the rack.

3. The ultraviolet device used for potato peel ripening according to claim 1, wherein the ultraviolet device further comprises a speed changer, a driving wheel, a power input shaft and a centrifugal fan belt wheel, the power input shaft is connected with the speed changer, the speed changer penetrates through the right protection plate through a rotating shaft to be connected with the driving wheel, the centrifugal fan belt wheel is arranged on an input shaft of the centrifugal fan, and the driving wheel is connected with the centrifugal fan belt wheel through a belt.

4. The ultraviolet device used for potato peel ripening according to claim 2, wherein the ultraviolet device further comprises a storage battery, and the storage battery is arranged in a protection box between the rack and the right protection plate and provides power for the plant ultraviolet light supplementing lamps.

5. The ultraviolet device used for potato peel ripening according to claim 2, wherein the centrifugal fan comprises a fan shell, a bearing and a plurality of centrifugal fan blades.

6. The ultraviolet device used for potato peel ripening according to claim 5, wherein the centrifugal fan is connected to a cross beam of the rack with bolts through an external fixed support.

7. The ultraviolet device used for potato peel ripening according to claim 1, wherein three plant ultraviolet light supplementing lamps are provided, and two of the three plant ultraviolet light supplementing lamps are distributed and fixed on the left protection plate and the right protection plate.

8. The ultraviolet device used for potato peel ripening according to claim 7, wherein the front air outlets and the lower air outlets are uniformly arranged at intervals.

9. The ultraviolet device used for potato peel ripening according to claim 7, wherein the plant ultraviolet light supplementing lamps comprise a plurality of LED lamps which are arranged at intervals.

10. An ultraviolet device used for potato peel ripening, comprising a left protection plate and a right protection plate, wherein a first-stage potato-soil separation device and a second-stage potato-soil separation device are sequentially arranged between the left protection plate and the right protection plate, a first ventilation pipeline is arranged above the first-stage potato-soil separation device and the second-stage potato-soil separation device, a plurality of front air outlets are formed in a surface, corresponding to the first-stage potato-soil separation device, of the first ventilation pipeline, a plurality of lower air outlets are formed in the surface, corresponding to the second-stage potato-soil separation device, of the first ventilation pipeline, the first ventilation pipeline communicates with a centrifugal fan through a second ventilation pipeline, and the left protection plate and the right protection plate are provided with a plurality of plant ultraviolet light supplementing lamps used for irradiating the first-stage potato-soil separation device and the second-stage potato-soil separation device, respectively.

* * * * *